United States Patent
Yamada

(10) Patent No.: US 7,881,581 B2
(45) Date of Patent: Feb. 1, 2011

(54) OPTICAL TERMINATION UNIT

(75) Inventor: Yukio Yamada, Aichi-ken (JP)

(73) Assignee: Canare Electric Co., Ltd., Aichi-gun, Aichi-ken (JP)

( * ) Notice: Subject to any disclaimer, the term of this patent is extended or adjusted under 35 U.S.C. 154(b) by 164 days.

(21) Appl. No.: 12/285,118

(22) Filed: Sep. 29, 2008

(65) Prior Publication Data

US 2009/0110361 A1  Apr. 30, 2009

(30) Foreign Application Priority Data

Nov. 14, 2006  (JP)  ............................. 2006-307827

(51) Int. Cl.
*G02B 6/00* (2006.01)

(52) U.S. Cl. ...................... 385/135; 385/134; 385/136; 385/137; 385/138; 385/139

(58) Field of Classification Search .......... 385/134–139
See application file for complete search history.

(56) References Cited

U.S. PATENT DOCUMENTS

| | | | | |
|---|---|---|---|---|
| 6,085,013 | A * | 7/2000 | Yatsu | 385/135 |
| 6,721,484 | B1 * | 4/2004 | Blankenship et al. | 385/135 |
| 6,963,689 | B2 * | 11/2005 | Battey et al. | 385/135 |
| 7,013,074 | B2 * | 3/2006 | Battey et al. | 385/135 |

FOREIGN PATENT DOCUMENTS

| | | |
|---|---|---|
| JP | D1184727 | 7/2003 |
| JP | D1185087 | 7/2003 |
| JP | 2004-170926 | 6/2004 |

\* cited by examiner

*Primary Examiner*—Charlie Peng
*Assistant Examiner*—Guy G Anderson
(74) *Attorney, Agent, or Firm*—McGinn IP Law Group, PLLC

(57) ABSTRACT

An optical termination unit is provided for allowing an optical cable to be easily projected straight in any of five directions, including upward, downward, rightward, leftward, and rearward directions, thereby enhancing the efficiency of cable laying or the like. An end securing box 150 of the optical termination unit 100 includes a two-stage multi-tiered box structure separable to two bodies, the first stage including a clamp tray 120 and the second stage including a fusion tray 130 which is provided with a lid (lid 140) thereupon. An inlet Im (m=1, 2, 3, 4, 5) for introducing the end of a second optical cable to be embedded in a wall or a pillar is provided at each face of the enclosure. Holes H1 and H2 formed on the rear face 115 are provided for securing the end securing box 150 with a nylatch n. The end securing box 150 having a rectangular solid shape has multiple holes formed therein. This allows the end securing box 150 to be secured to a rear face 115 so as to be arbitrarily oriented on a right angle basis.

18 Claims, 15 Drawing Sheets

Fig. 3
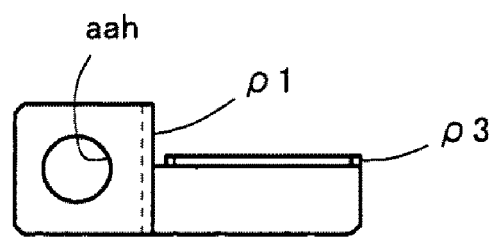
PLAN VIEW
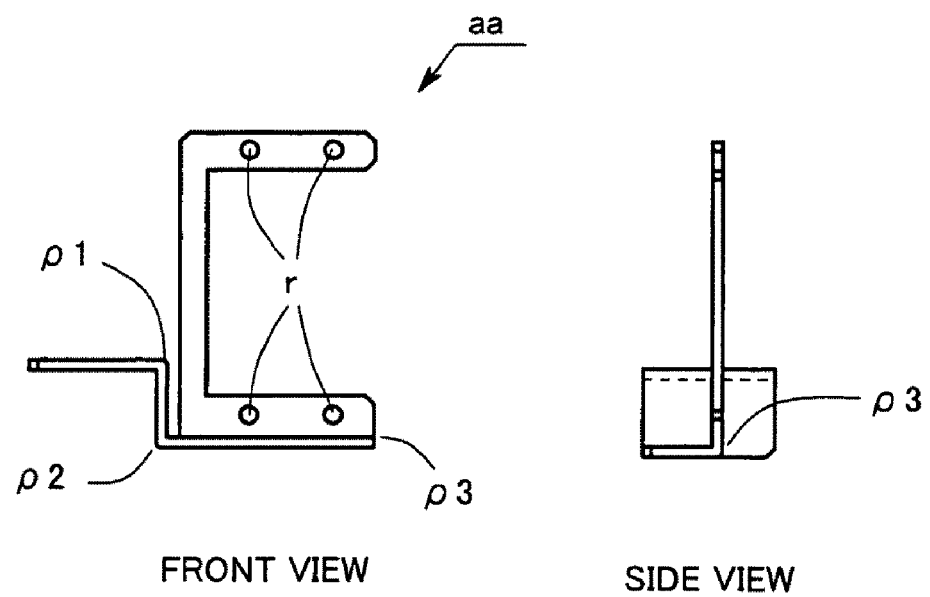
FRONT VIEW
SIDE VIEW

Fig. 14-A
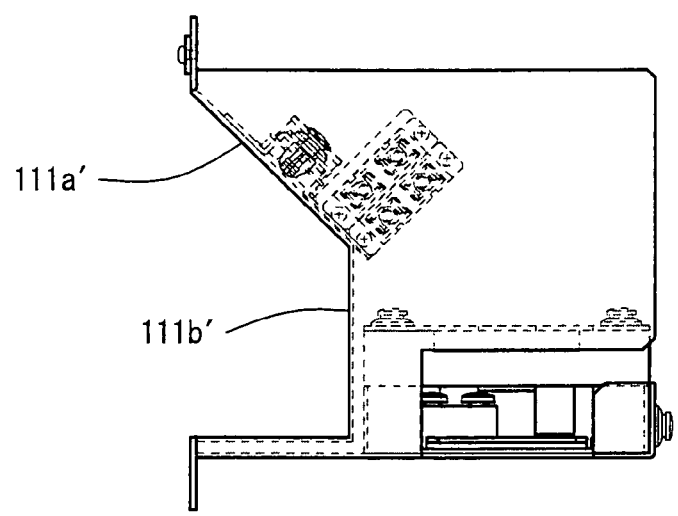
Fig. 14-B
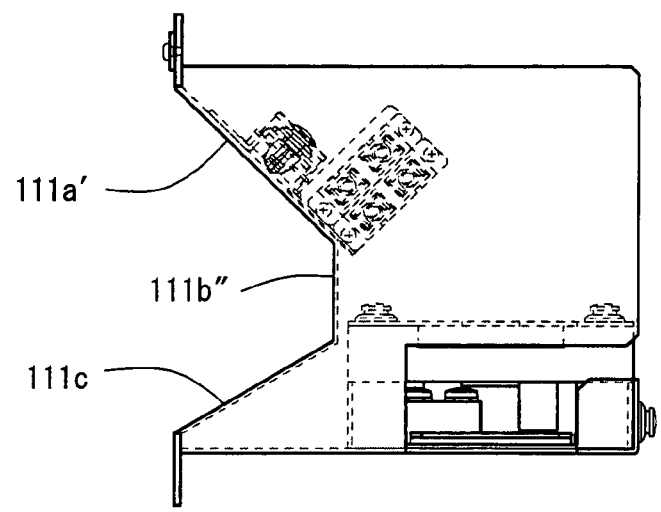
Fig. 14-C
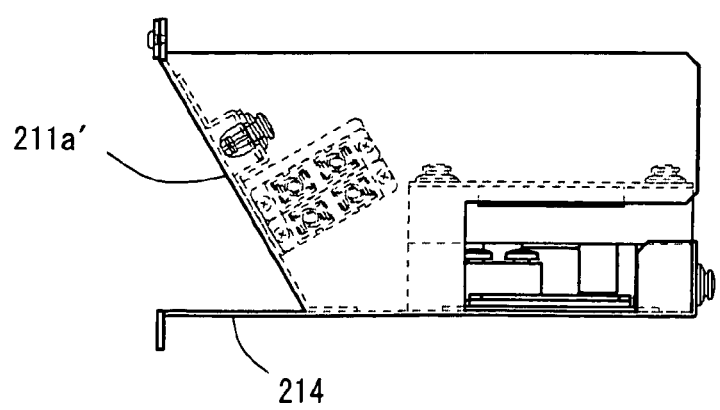

IN-WALL HOUSING SPACE FOR OPTICAL TERMINATION UNITS

OPTICAL TERMINATION UNIT

BACKGROUND OF THE INVENTION

1. Field of the Invention

The present invention relates to an optical termination unit integrally constructed with a connection panel to be secured to a building or the like for allowing connection of an optical fiber thereto. The optical termination unit of the present invention is useful as a small, compact camera terminal connecting board when a television broadcasting system or the like is constructed.

2. Description of the Related Art

As an optical termination unit integrally constructed with a connection panel to be secured to a building or the like for connecting an optical fiber, the prior art described in Japanese Unexamined Patent Application Publication No. 2004-170926, for example, is publicly known. FIG. 15 of this patent application is a side view of the apparatus described in Japanese Unexamined Patent Application Publication No. 2004-170926 (FIG. 4). A connection unit 4 in the figure, for securing the armor (outermost resin layer) of an optical cable 6 and the end of a tension member 8 of the optical cable 6 by means of fixtures 23, 24, is secured to a second surface 3b slanting upward and extending inward toward an outer frame panel 2. The connection unit 4 allows the optical cable 6, more resistant to bending, pulling or the like than an optical fiber, to extend rearward, reducing the possibility of being mistakenly cut off optical fiber during cable laying or servicing operations.

The apparatuses in the prior art described in Japanese Application for Design Registration No. 1184727 and Japanese Application for Design Registration No. 1185087 are believed to be similar in structure to the above-mentioned apparatus.

However, since the connection unit 4 is secured to the second surface 3b, the extending direction of the optical cable 6 is necessarily limited to the second surface 3b or its close vicinity. Accordingly, if the optical cable 6 is introduced into the optical termination unit in a direction other than the extending direction, the optical cable 6 must be bent so as to enter the unit.

Meanwhile, from the viewpoint of loads put on the optical cable and its fixtures as well as their durability and reliability, it is generally undesirable to bend the optical cable 6 with a curvature radius of 6 to 7 cm or less since the optical cable 6 is designed to provide sufficient resistance to bending or pulling, as shown above.

Continuous bending of the optical cable with a much smaller curvature radius than mentioned above is not always easy during work on the optical cable. Accordingly, the structure of the optical termination unit which forces such bending places limitations on working efficiency associated with optical cable laying or servicing operations.

For this reason, in the above prior art, vertically introducing the optical cable 6 into the optical termination unit from directly above or below or horizontally introducing the optical cable 6 into the optical termination unit from behind tends to pose a problem regarding routing of the optical cable 6 within the internal space of the optical termination unit. In these cases, namely, if the optical cable 6 is introduced, in particular, vertically or horizontally from behind, larger lower limits of curvature radius of the optical cable 6 within the range allowing the cable to be easily bent during work will result in an increase in the size of the optical termination unit, diminishing the compactness of the optical termination unit. Besides, from the viewpoint of standardization of product specifications, it is undesirable to alter the enclosure size or shape of the optical termination unit, depending on the incoming direction of the optical cable.

Furthermore, when an optical cable installed inside a building is taken to the outside through a pillar or wall, the extending direction of the cable is usually vertical or horizontal, considering ease of design or ease of construction of a building. It is likely that the direction of a cable coming into the optical termination unit is necessarily limited to these directions. For this, addressing the above problem is important and unavoidable, from the viewpoint of industries including the construction industry. In other words, from the viewpoint of ease of design or ease of construction of a building, it is undesirable that the optical termination unit have a structure where the second surface 3b is inclined at approximately half of a right angle.

With the increasing number of optical fibers or wires contained in optical cables and higher rigidity of optical cable tension members or armor, there has been a resultant increase in the lower limit of curvature radius permitted for an optical cable, making the above problem more serious in the future.

SUMMARY OF THE INVENTION

The present invention has been achieved to solve the above-mentioned problems. It is an object of the present invention to provide a compact optical termination unit integrated with a connection panel, which allows an optical cable to be easily projected straight vertically or horizontally, namely, in any of the upward, downward, rightward, leftward, and rearward directions, thereby tending to enhance the efficiency of cable laying or servicing operations.

The following means is effective to solve the above-mentioned problems.

The first means of the present invention is an optical termination unit integrally constructed with a connection panel to be secured to a building for allowing connection of a terminal of a first optical cable to be connected with filming equipment, the unit including an enclosure having an inlet for a second optical cable secured to a building provided at a rear face, top face, bottom face, left side, and right side thereof, five surfaces in total, and having a front panel constructed with the connection panel above, and a rectangular solid shaped end securing box for securing a tension member end exposed from the second optical fiber thereinside, wherein the direction in which the exposed portion of the tension member is secured inside the end securing box is along a line normal to any one of other four adjacent surfaces of the end securing box perpendicular to a securing surface for securing the end and wherein the end securing box is disposed inside the enclosure so that each line normal to the securing surface and the four adjacent surfaces is oriented toward the vertical or horizontal direction and any one surface of the end securing box is arbitrarily oriented so as to be parallel to the left side.

The above-mentioned rectangular solid shape does not mean a complete rectangular solid shape, but may have three sets of two parallel surfaces and have non-parallel surfaces in six surfaces in total perpendicular to each other. Besides, each of these surfaces may be provided with a hole, groove, or slit. Each surface must have a hole (inlet) for introducing a second optical cable as well as a hole (outlet) for projecting out an optical fiber in at least one location thereof. The rectangular solid shape may have rounded corners and edges, and have a window or recess at any one of surfaces thereof. If an optical cable is provided with an electric wire, the end securing box preferably has an outlet provided separately for that wire.

Each of five inlets in total provided in the enclosure above may have any size and, for example, the whole upper part of the enclosure may be used as one inlet for the second optical cable. Besides, inlets on adjacent surfaces may be integrated into one astride a side of the enclosure. Accordingly, for example, two inlets may be integrated into one which is astride a nodal line (side) between the bottom face and the back face of the enclosure.

The second means of the present invention is the first means, wherein the end securing box is secured to the rear face of the enclosure with being in contact with the rear face and bottom face.

The third means of the present invention is the first and second means, wherein the end securing box has only one surface provided thereon for becoming the securing surface, and a surface for introducing the second optical cable into the end securing box is selected from only two surfaces, perpendicular to each other, of the four adjacent surfaces according to any one of the five surfaces on which the inlet is provided, and each of the two surfaces is provided with an inlet for introducing the second optical cable.

The forth means of the present invention is any one of the first, second, and third means, wherein the end securing box is provided with a fusion tray, doubling as a slack case, for housing a fused portion where different optical cables are connected at each one end thereof by means of fusion and a slack of such fused optical cable.

The fifth means of the present invention is the fourth means, wherein the end securing box is a two-stage multi-tiered box separable to two bodies and the fusion tray above is constructed with one body of the two bodies which does not have the securing surface above.

The sixth means of the present invention is any one of the first through fifth means, wherein the front face of the enclosure includes a recess which is provided with a slant surface facing downward and inclined at more than 45 degrees and less than 90 degrees, the slant surface being provided with a connector terminal to be connected with the first optical cable.

Preferably the angle of inclination is not less than 50 degrees and not more than 70 degrees. Smaller angle of inclination may not facilitate the effective implementation of compactness, while excessively greater angle of inclination tends to diminish the effect of the first optical cable extending obliquely downward.

The seventh means of the present invention is any one of the first through sixth means, wherein a first hole is formed on the enclosure at the surface of contact with the end securing box and a second hole is formed on the end securing box at the position contacting with the enclosure and corresponding to the first hole, whereby a fastener running through the first and second holes overlapping with each other is used to secure the end securing box to inside the enclosure.

However, the first hole may be provided in any numbers. Well-known or any fixture can be used as the fastener.

The eighth means of the present invention is the seventh means, wherein the enclosure is provided with the first hole on any one of the rear face, top face, bottom face, left side, and right side thereof, while the end securing box is provided with the second hole on all surfaces contacting with a surface containing the first hole of the enclosure.

The above-mentioned means of the present invention can effectively or reasonably solve the above-mentioned problems.

The means of the present invention provide the following effects.

The first means of the present invention allows the end securing box to be arbitrarily oriented on a right-angle basis, thereby enabling the second optical cable to be vertically or horizontally introduced to the optical termination unit through any of inlets provided in the above-mentioned five directions. Besides, the direction of the incoming cable is limited to the direction parallel to or perpendicular to the wall on which the optical termination unit is mounted. For this, when the second optical cable is introduced, in particular, vertically, or horizontally from rearward, or, needless to say, when the second optical cable is introduced horizontally through the left or right side, the first means of the present invention eliminates the necessity of bending the second optical cable inside the optical termination unit, thereby achieving as short routing of the second optical cable as possible inside the optical termination unit.

Accordingly, the first means of the present invention allows the second optical cable to be easily extended straight in any of 5 directions including upward, downward, rightward, leftward, and rearward, thereby easily constructing a compact optical termination unit which provides enhanced efficiency in cable laying or servicing operation.

Besides, since the use of such structure eliminates the necessity of bending the second optical cable inside the optical termination unit, the enclosure needs not be enlarged even if a somewhat larger second optical cable is used, which is advantageous to the implementation of more compact units and standardization.

Furthermore, the use of such structure eliminates the necessity for oblique wire routing of the second optical cable inside a wall or pillar of a building, allowing the second optical cable to be introduced vertically or horizontally from directly above, directly below, or rearward, which is favorable to ease of design or ease of construction of a building.

The existing unit in FIG. 19 is provided with a second surface 3b inclined at a half of a right angle, the second surface 3b having a connection unit 4 mounted thereon. The optical termination unit of the present invention needs not include a second surface 3b slanted upward and extending inward of an outer frame 2. For this reason, the optical termination unit of the present invention enhances ease of design of an enclosure front panel having a connection panel mounted thereon, allowing at least front design of an enclosure to be optimized to meet user's requirements.

The second means of the present invention eliminates the need of disposing a fixture (such as a nylatch) at the side faces (right and left sides), the fixture securing an end securing box to inside the enclosure, since the end securing box is secured to the rear face of the enclosure. When the enclosure is slid into a hole on a building wall, this arrangement prevents the fixture from being in contact with or rubbing against a sliding surface (a surface rubbing against the enclosure) inside the hole. Accordingly, the second means of the present invention eliminates the need of forming a groove on the hole along the direction of sliding through which the fixture passes, leading to no possibility of a broken fixture due to rubbing against the hole.

When an end securing box is formed in the form of a rectangular solid having any one of apexes at which three sides of different lengths meet, selecting as the securing surface a surface having the largest area from six surfaces is the easiest and most practical in actually constructing the securing surface. According to the third means of the present invention, constructing the other one only of surfaces having the largest area as the securing surface will suffice, thereby easily constructing the end securing box.

As analogized from the above-mentioned prior art, when an optical termination unit is constructed, the enclosure tends to create a room in the vicinity of the bottom face and rear face thereinside, while its horizontal direction tends to be the lengthwise direction inside the room. For this reason, to implement compacter optical termination units, an end securing box is constructed in the form of a thin rectangular solid which has one side much shorter than the other sides. In addition, the securing surface with the largest area is preferably disposed so that its lengthwise direction is aligned parallel to the horizontal direction of the enclosure and it mates with the bottom face or rear face of the enclosure.

For a compactness-oriented structure like this, according to the third means of the present invention, the placement of a second optical cable inlet at only two surfaces of six surfaces on an end securing box results in the construction of an end securing box which allows cables to be introduced from any of 5 directions above. Accordingly, the third means of the present invention is capable of very easily constructing a compact end securing box.

According to the forth means of the present invention, a fusion tray houses a fused portion and a slack of an optical fiber for their effective protection and orderly disposition, thereby preventing an optical fiber from being exposed to excessive stress, tensile force, or shearing force associated with a work. This enhances working efficiency as well as secures the reliability of an optical fiber with ease. Besides, the fusion tray is integrated with the end securing box into one piece, eliminating the need of separately securing them to inside the enclosure.

According to the fifth means of the present invention, the fusion tray is isolated as a separate unit from the vicinity of a tension member securing portion where a wire can be routed, providing further efficient and effective protection and orderly disposition of a fused portion and a slack of an optical fiber as well as achieving simplified structure of the fusion tray itself.

According to the sixth means of the present invention, even if significant limitations are placed on the height of the enclosure or the length along the vertical direction of the optical termination unit, the first optical cable can be extended obliquely downward from the connection panel on the front panel, whereby a further compact optical termination unit can be constructed according to the present invention.

According to the seventh means of the present invention, the first or second hole formed on each of the contact surfaces constructs a means for securing an end securing box, contributing to extremely simplified structure of the unit.

According to the eighth means of the present invention, since disposition of an end securing box is limited to a certain region inside the enclosure, a space for disposing the end securing box is minimized, which is advantageous to the implementation of a compacter unit.

If part of a fixture is projected or exposed to the outside, an interface with the outside or the appearance must be reviewed for improvement. However, according to the eighth means of the present invention, the number of the first holes to be formed in the enclosure can be minimized, thereby minimizing the necessity of such review for improvement as well.

BRIEF DESCRIPTION OF THE DRAWINGS

FIG. 3 is a front view, a plan view, and a side view of an adaptor angle aa;

FIG. 14A is a side view exemplifying other frontal shapes of the enclosure;

FIG. 14B is a side view exemplifying other frontal shapes of the enclosure;

FIG. 14C is a side view exemplifying other frontal shapes of the enclosure; and

DESCRIPTION OF THE PREFERRED EMBODIMENTS

Figure 15:
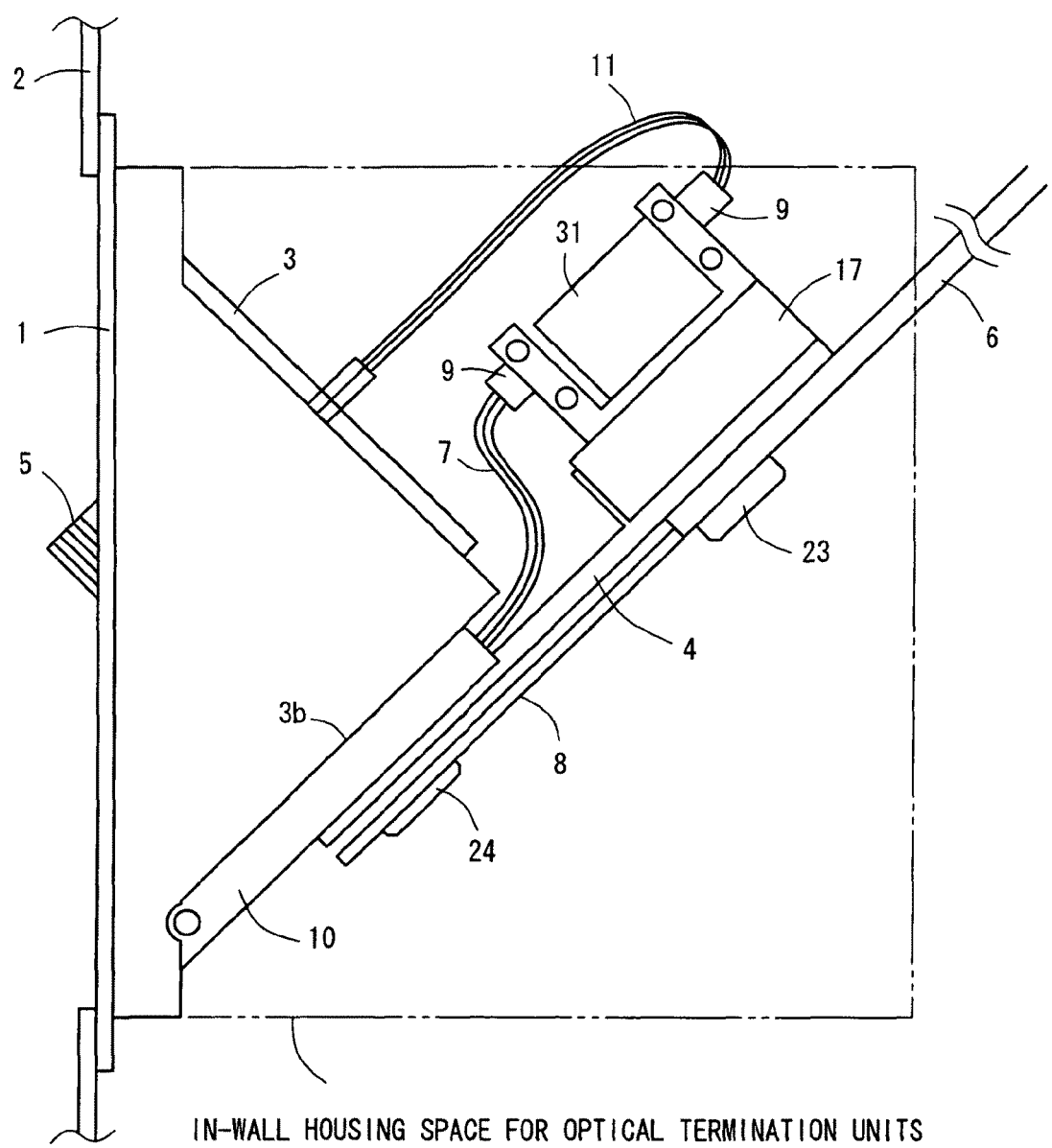
FIG. 15 is a side view of an existing optical termination unit.

To secure the end of a tension member exposed from the tip of an optical cable, it is preferable to use a securing means (highly rigid TM clamp), such as a metallic TM clamp 1410 as shown in FIG. 6A in Japanese Unexamined Patent Application Publication No. 2005-301153 or a metallic TM clamp 20 in FIG. 27A in the same Publication, which directly screws the tension member from the side perpendicular to its axis. The use of this securing means allows an optical cable to completely match a tension member end (securing portion) in the axial position and direction as well as allowing the tension member to be firmly secured to the inside of the optical termination unit by screwing. In other words, the securing means for a tension member of an existing apparatus in FIG. 15 contains a critical, unavoidable problem in terms of such securing means.

The present invention will be described below with reference to examples. An embodiment according to the present invention is not limited to the examples below.

Example 1

Figure 1:
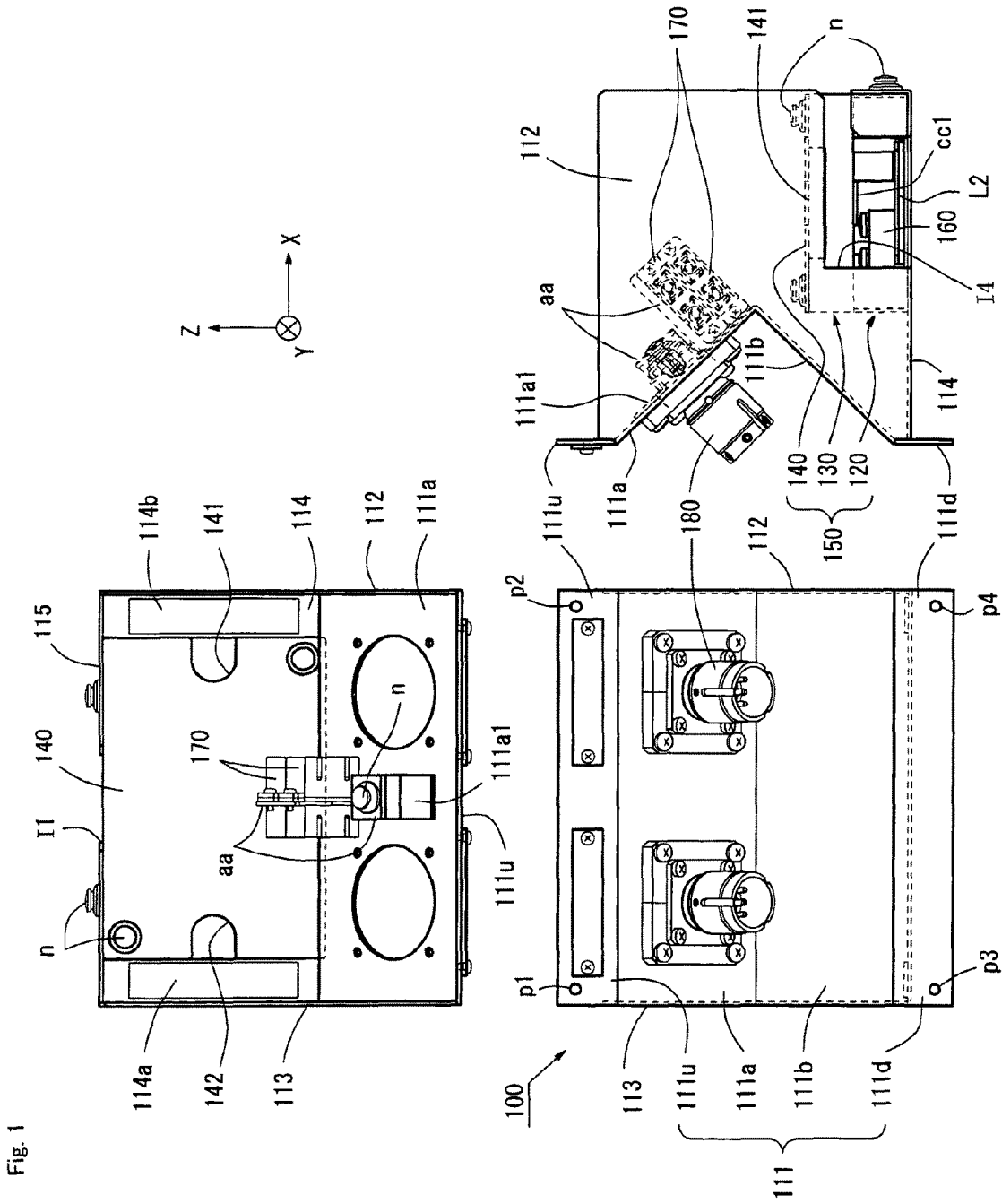
FIG. 1 is a front view, a plan view, and a side view of an optical termination unit 100 according to Example 1.
Figure 2:
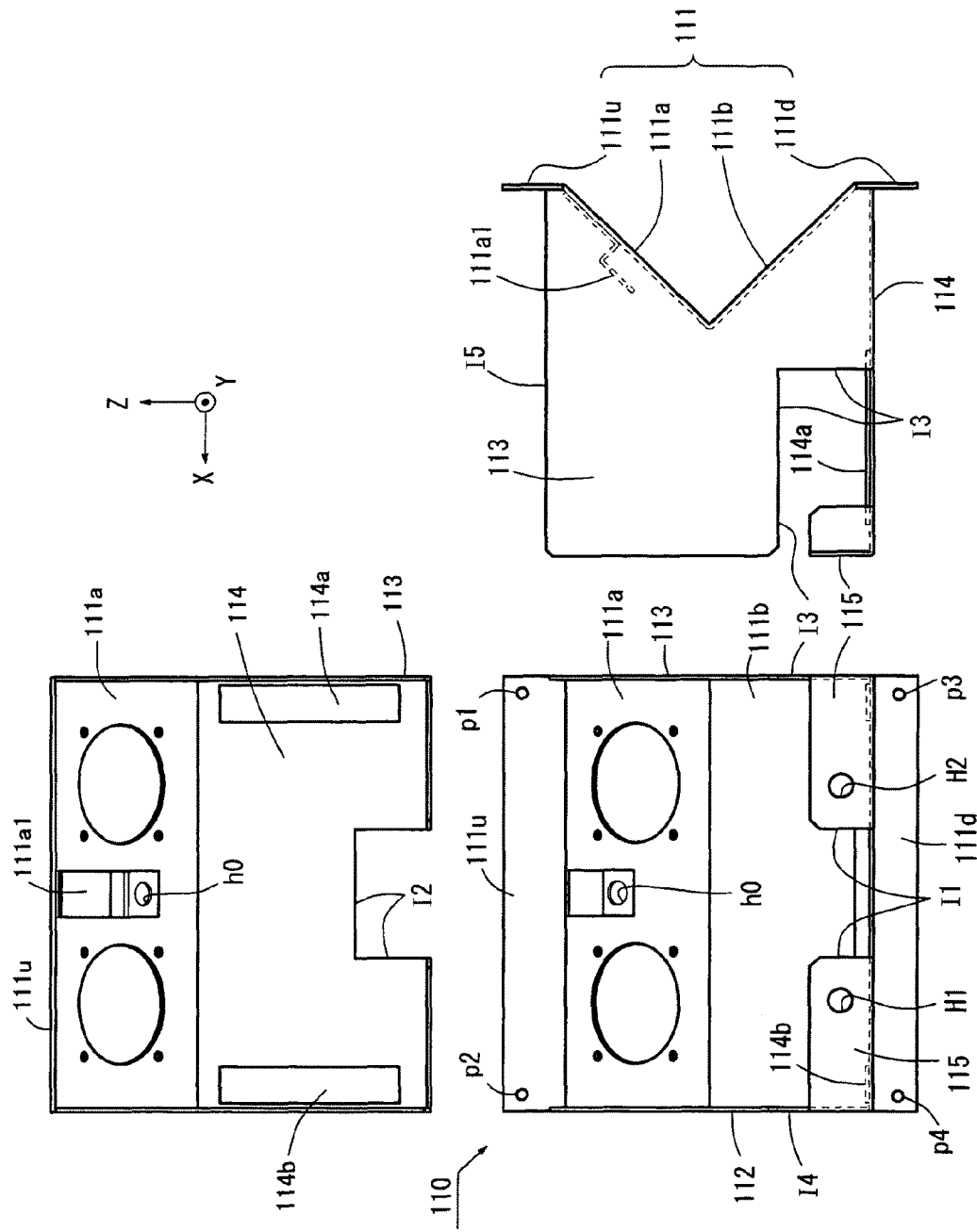
FIG. 2 is a rear view, a plan view, and a side view of an enclosure 110 of the optical termination unit 100.

FIG. 1 shows a front view (at the lower left in the figure), a plan view (at the top in the figure), and a side view (at the right in the figure) of an optical termination unit 100 according to Example 1. The XYZ (capital letters) rectangular coordinates in FIG. 1 relates to a front view at the lower left, where the Z-axis represents the vertical direction. FIG. 2 is a rear view (at the lower left in the figure), a plan view (at the top in the figure), and a side view (at the right in the figure) of the enclosure 110 of the optical termination unit 100. The XYZ rectangular coordinates in FIG. 2 show the same coordinate system as above and relates to a rear view at the lower left.

The front panel 111 forming the connection panel of the optical termination unit 100 provided by the enclosure 110 includes a recess having a front upper part 111a and a front lower part 111b thereof making a right angle. Each of a right face 112 and a left face 113 in the enclosure has a sideways M shape. The front panel 111 includes a front upper part 111a and a front lower part 111b, and an upper end face 111u and a lower end face 111d both of which are parallel to a wall (or pillar) on which the optical termination unit 100 is mounted. The front upper part 111a is provided with two connector terminals 180, with which a first optical cable (not illustrated) extending from a television camera is connected.

Figure 4:
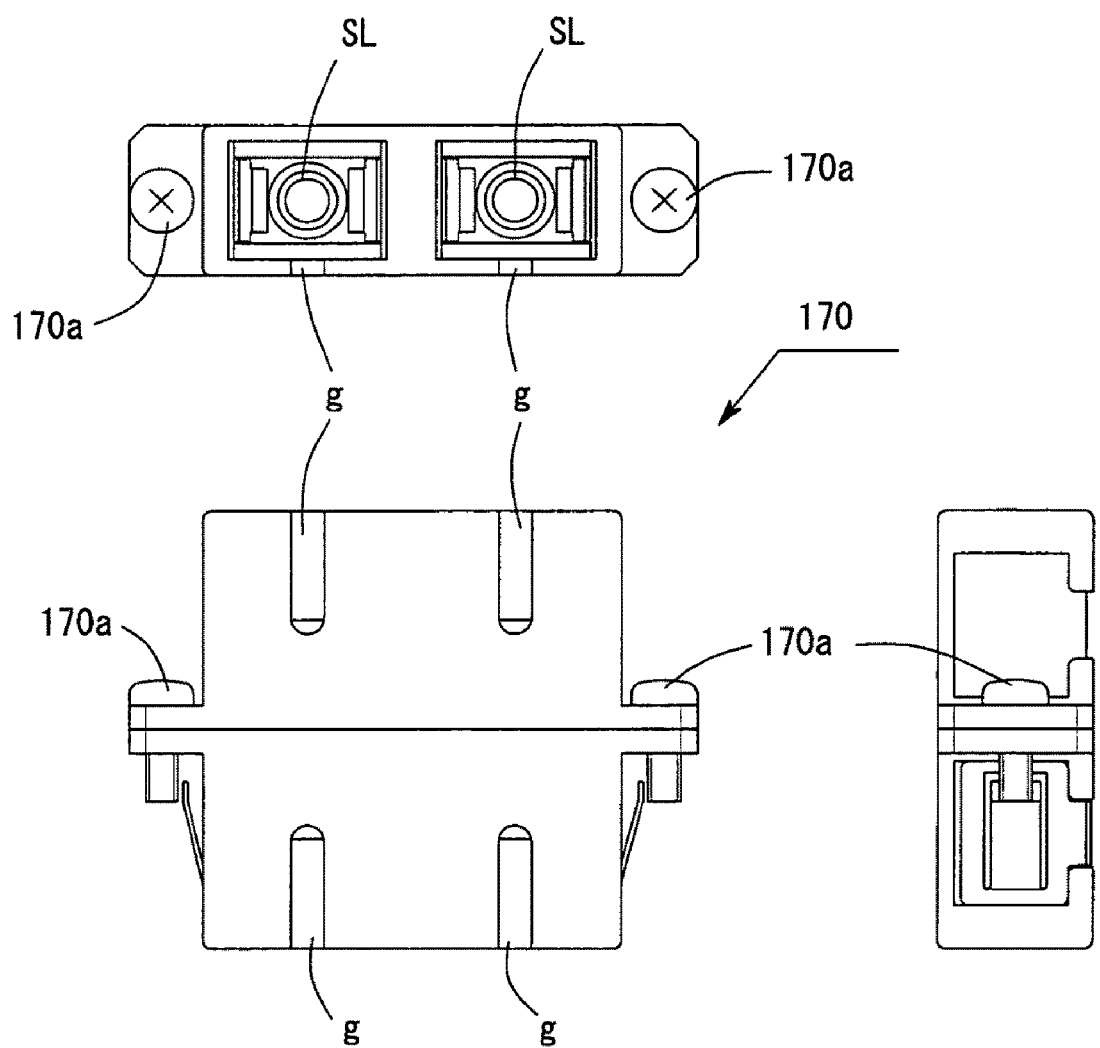
FIG. 4 is a front view, a plan view, and a side view of a double SC adaptor 170.

The front upper part 111a has a catch 111a1 formed at the back thereof. The adaptor angle aa in FIGS. 1 and 3 is secured to the catch in such a manner that its hole aah and a nylatch n (FIG. 1) are secured to the hole h0 of the catch 111a1. The adaptor angle aa, a metallic component for holding and securing two double SC adaptors as shown in FIG. 4 together, is manufactured by bending so as to form three bends ρ1, ρ2, and ρ3. The adaptor angle has four holes r provided for securing two double SC adaptors 170, which are secured side by side to each other by tightening screws 170a through the holes r, as shown in FIG. 1.

The double SC adaptor 170 is an optical connection apparatus providing a receptor for an SC connector mounted on the tip of a single mode fiber, and includes a double connecting portion for integrating two optical fibers into one by providing a receptor bi-directionally. The split SL in FIG. 4 constitutes this connection portion, consisting of a cylindrical metallic tube having a slit along the axial direction. Accordingly, the optical termination unit 100 having two double SC adaptors 170 totals four such connecting portions. For this, one first optical cable mentioned above can be provided with two optical fibers.

The enclosure 110 has a reserve expansion space (namely, space for expansion to accommodate a double SC adaptor 170) at the center thereof, which allows one first optical cable to be provided with three or four optical fibers.

A symbol g refers to a slit formed at the side of a SC connector for guiding a projection on the outer wall.

The end securing box 150 of the optical termination unit 100 includes a two-stage multi-tiered box that can be separated into two bodies, the first stage including a clamp tray 120 and the second stage including a fusion tray 130 which is provided with a lid (lid 140) thereupon.

The enclosure 100 has reinforcing plates 114a, 114b welded to the bottom thereof for protecting the enclosure 110 from unexpected deformation resulting from bending of the enclosure 110. Inlets Im (m=1, 2, 3, 4, 5) for introducing the end of a second optical cable to be embedded in a wall or a pillar are provided at the rear face 115, bottom face 114, right face 113, left face 112, and top face of the enclosure, respectively. However, the inlet on the top face is formed by the entire opening on the top of the enclosure 110, the opening being enclosed by the front face 111, right face 112, and left face 113. Inlets I1 and I2 are connected with each other on a side at which the rear face 115 and the bottom face 114 are at right angles to each other. Holes H1 and H2 formed on the rear face 115 are provided for securing the end securing box 150 with a nylatch n, as shown in FIG. 1, corresponding to the first hole in claim 7.

Figure 5:
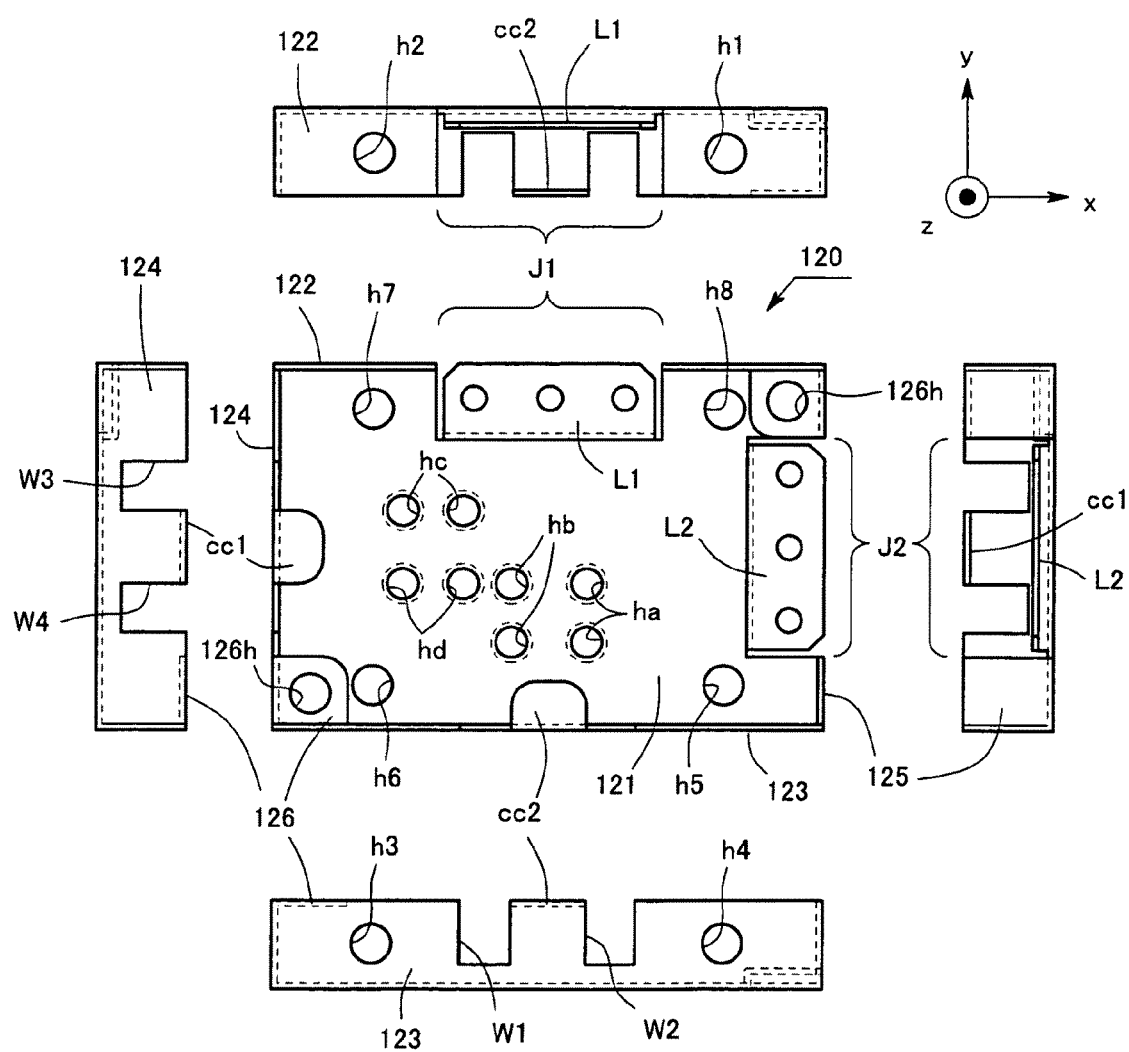
FIG. 5 is a plan view, a front view, a rear view, and both of right- and left-hand side views of a clamp tray 120.

FIG. 5 shows a plan view, a front view, a rear view, and both of right- and left-hand side views of a clamp tray 120. The xyz (small letters) rectangular coordinates in FIG. 5 relates to a plan view in the middle of the figure. The clamp tray 120 is constituted by the bottom face 121, front face 123, rear face 122, left face 124, right face 125, and top face 126 thereof. The rear face 122, front face 123, left face 124, and right face 125 constitute adjacent faces each of which is perpendicular to the bottom face 121.

Figure 7:
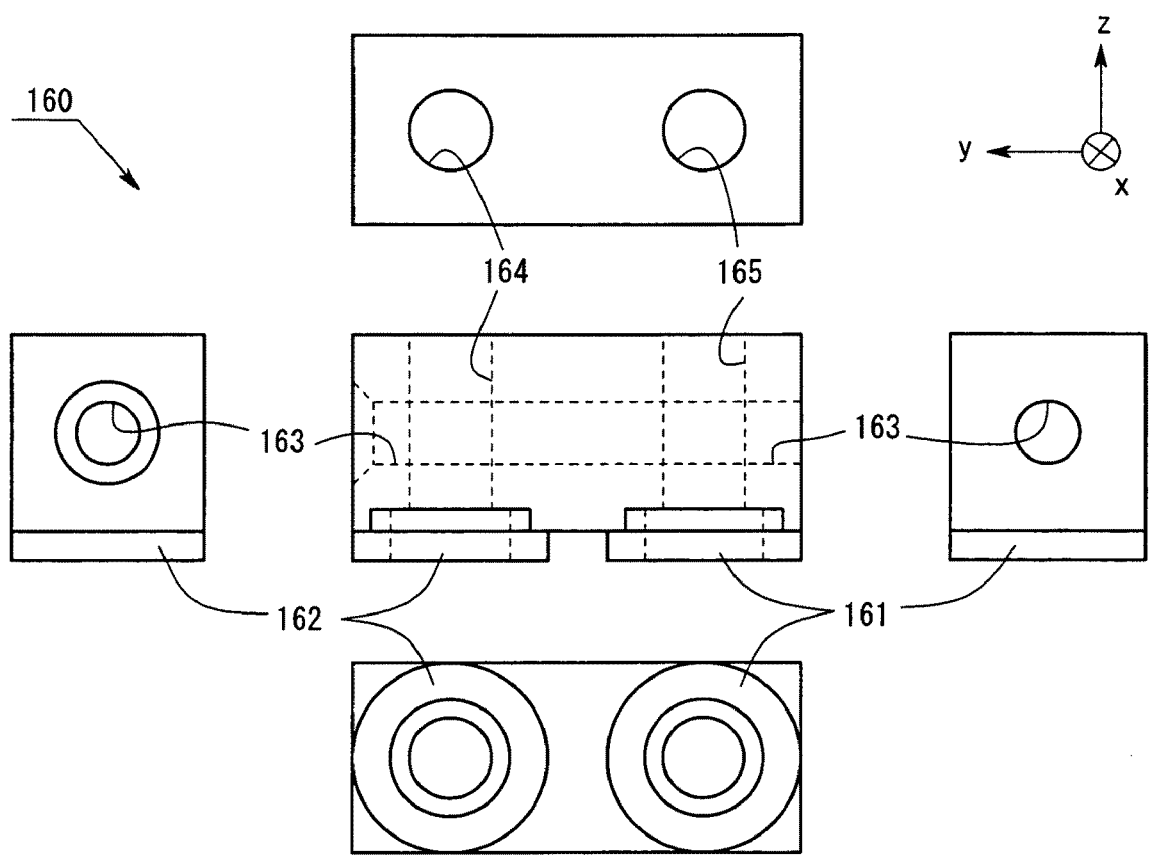
FIG. 7 is a side view, a front view, a rear view, a plan view, and a bottom view of a TM clamp 160.

The bottom face 121 of the clamp tray 120 shown in the plan view embodies a securing surface of the present invention, namely a securing surface of the end securing box 150, and has holes ha, hc, and hd for securing a TM clamp 160, shown in FIGS. 1 and 7, formed thereon. Only the bottom face 121 includes these holes for securing a TM clamp 160, while faces other than the bottom face are not the securing surface of the present invention. The inlet J1 formed at the center of the rear face 122 and the inlet J2 formed at the center of the right face 125 are designed for introduction of the end of the second optical cable into the inside of the clamp tray 120 or the inside of the end securing box 150. The inlets J1 and J2 include lower parts formed as lips L1 and L2, respectively.

According to the structure of the clamp tray 120, a surface for projecting out a second optical cable from inside the end securing box 150, namely, a surface for introducing a second optical cable into the inside of the end securing box can be selected from either of the rear face 122 or the right face 125.

Holes hi (i=1, 2, 3, . . . , 8) formed in the front face 123, bottom face 121, and rear face 122 are designed for securing the end securing box 150 to the rear face 115 of the enclosure 110. These holes arbitrarily combined with the holes H1 and H2 above are secured with a nylatch, whereby the end securing box 150 can be mounted inside the enclosure 110 so as to be oriented toward a desired direction, as detailed below with reference to FIG. 11.

Cord clamps cc1 and cc2 are provided for limiting the range of each optical fiber cord routing to the inside of the clamp tray 120. Windows w1, w2, w3, and w4 are provided for extracting a cord outside the end securing box 150 (clamp tray 120) therethrough. Since one of the inlet J1 or the inlet J2 is not used, a cord may be drawn out through an unused inlet.

Figure 6:
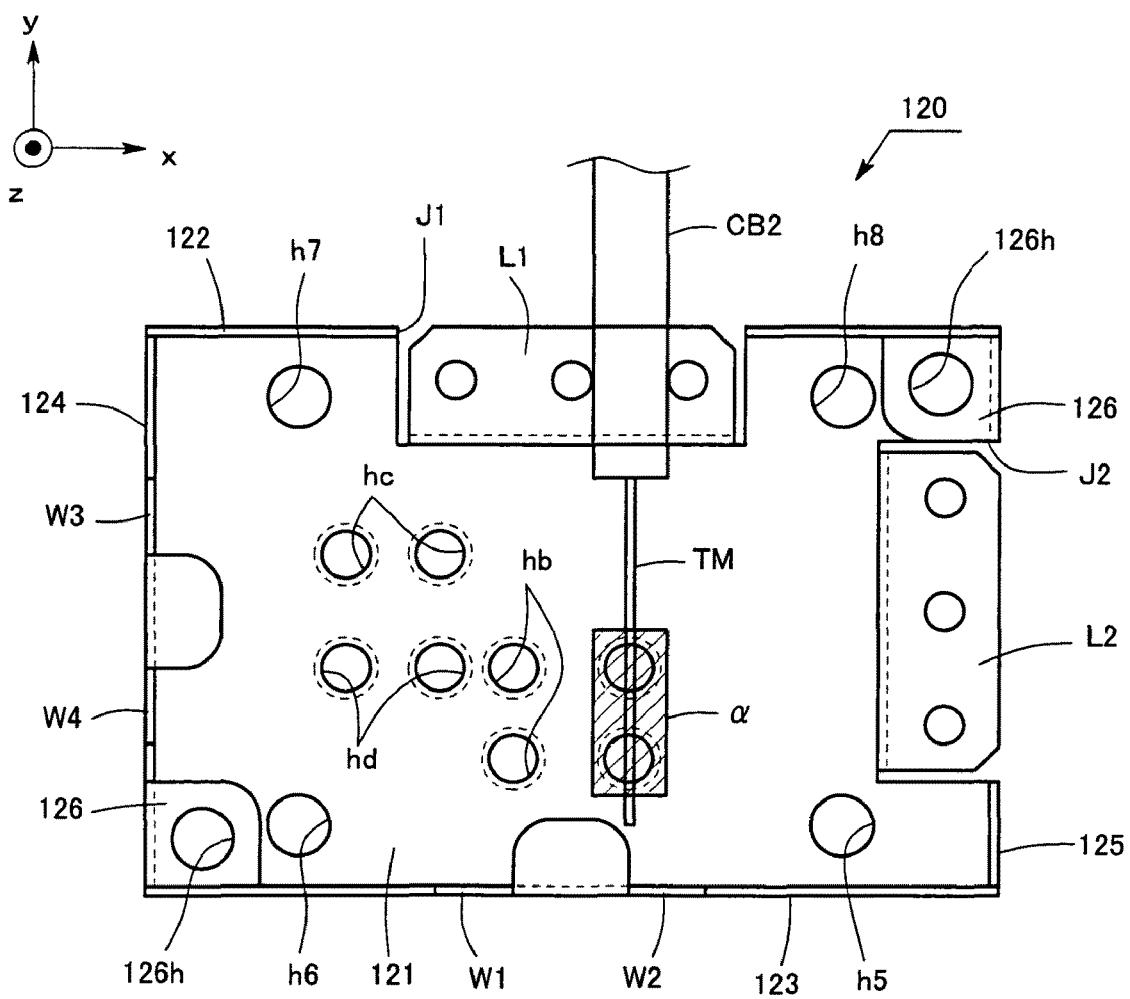
FIG. 6 is a plan view of the clamp tray 120.

The means for securing a second optical cable is detailed with reference to FIG. 6. The symbol TM indicates the location of a tension member exposed from the second optical cable CB2. The region a on the bottom face 121 indicates the location where the metallic clamp 160 in FIG. 7 is to be disposed. The xyz rectangular coordinates in FIG. 7 relates to the side view in the middle of the figure. The TM clamp 160 in FIG. 7 is oriented as shown in the region a in FIG. 6 and is secured to the bottom face 121 of the clamp tray 120 by inserting insulating screws from the back side of the bottom face. These insulating screws are screwed into insulating rings 161 and 162 and threaded holes 164 and 165. These insulating components secure insulation between the tension member TM and the clamp tray 120. The end of a tension member TM exposed from the end of the second optical cable CB2 embedded in a wall or a pillar is inserted through the hole 163 of a TM clamp 160 to the location as shown in FIG. 6 and mounted on the TM clamp 160 using screws through threaded holes 164 and 165, whereby the end of the second optical cable is firmly secured to the bottom face 121 of the clamp tray 120 or the securing surface of the end securing box 150.

At this time, the direction (namely, the y-axis direction in FIG. 6) in which an exposed portion of the tension member TM is secured inside the clamp tray 120 (namely, the end securing box 150) is normal to the rear face 122 perpendicular to the securing surface (namely, bottom face 121) to which the end of the tension member TM is secured.

Holes hb, hc, and hd can be used in the same manner. For example, the use of the hole hc or hd allows the end of the tension member TM to be secured in the x-axis direction, wherein the second optical cable CB2 can be introduced into the clamp tray 120 through the inlet J2 having a lip L2. Generally, two second optical cables are introduced from the same direction through the same inlet in such a manner that they are parallel to each other.

Three inline holes formed in lips L1 and L2 are designed for securing the second optical cable CB2 to the lips L1 and L2 by tying the cable with a band through these holes. Preferably, the portions of the cable tied with the band and its vicinity are reinforced in advance using a vinyl tape or the like. The lips L1 and L2 are somewhat spaced from the bottom face 121 to strengthen the lips L1 and L2, thereby enhancing the strength of the bottom face 121 as well as the lips L1 and L2. Namely, portions for securing the tension member TM and second optical cable CB2 are preferably provided with significantly high strength. Such a structure is also effective for completely aligning the second optical cable CB2 secured to the lip L1 (or L2) using a tying band with the hole 163 of the TM clamp 160 along the axial direction thereof. These means allows the end of the optical cable CB2 to be precisely, firmly secured to the clamp tray 120.

Figure 8:
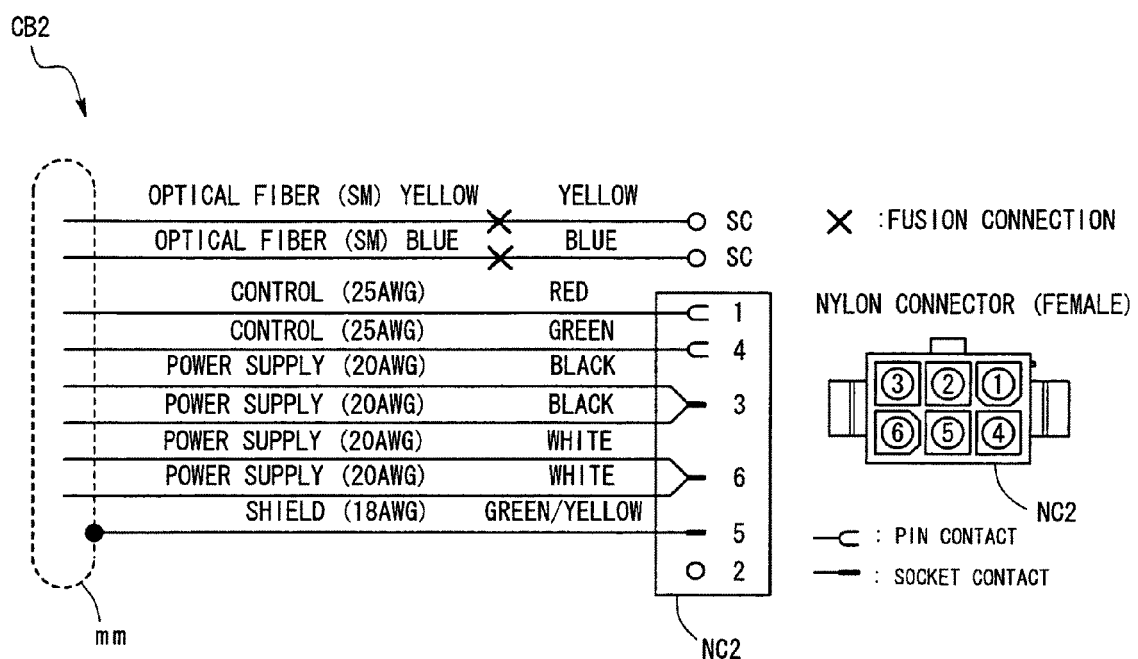
FIG. 8 is a wiring diagram showing connection specifications for a second optical cable CB2.

FIG. 8 depicts the specifications for connection of the second optical cable CB2. The second optical cable CB2 includes two optical fibers and seven wires therein. As shown in FIG. 8, each of the wires inside the second optical cable CB2 is connected at the exposed end thereof with a predetermined terminal of a nylon connector NC2 via a predetermined pin or socket. The symbol mm depicts a shield formed by a metallic mesh.

Meanwhile, each of optical fibers inside the second optical cable CB2 is fusion-connected at the exposed end thereof with the end of a connecting cable (single mode fiber) fitted with a supplied SC connector in such a manner that such connection takes place at the position indicated by X in FIG. 8.

Figure 9:
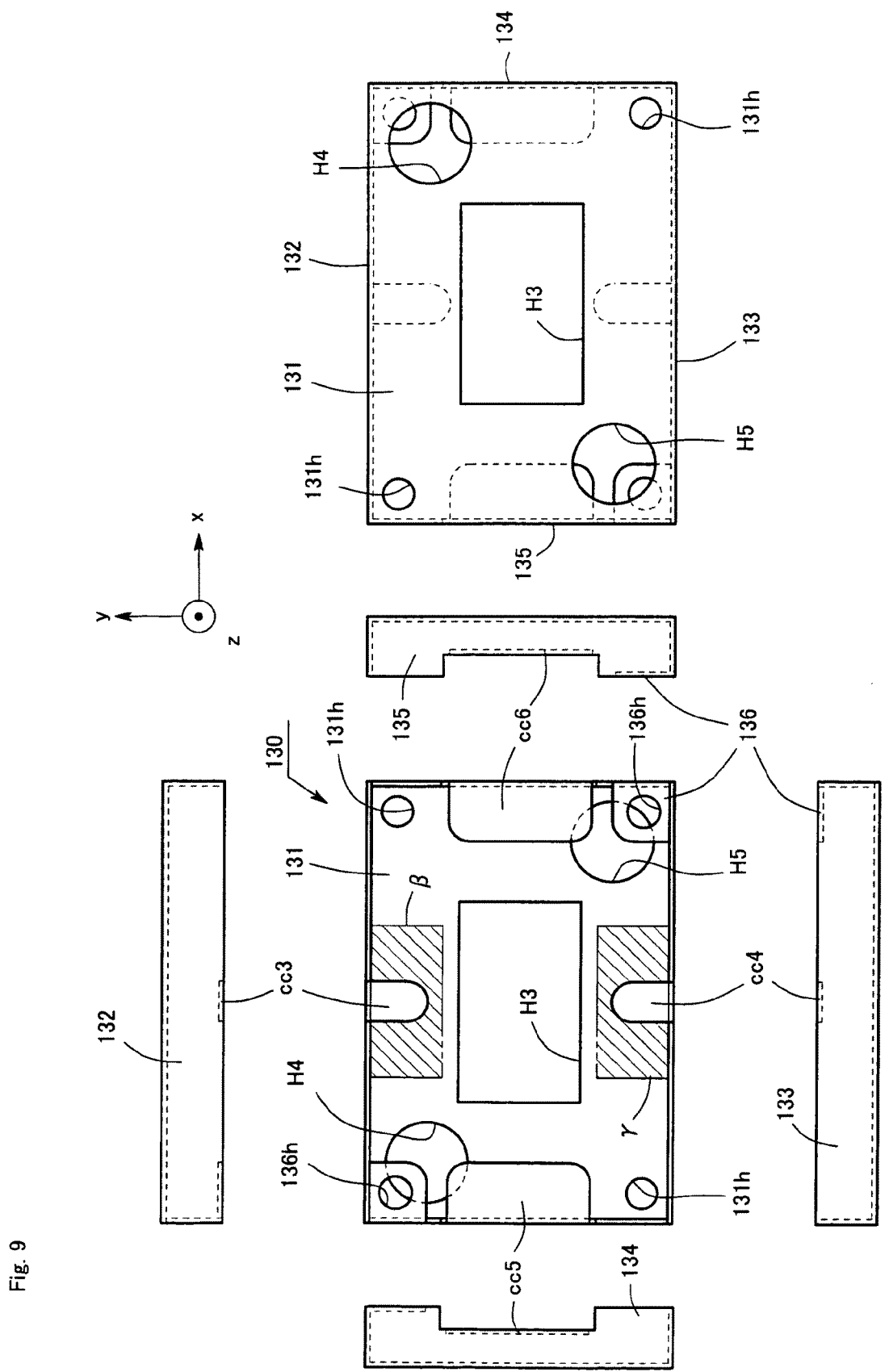
FIG. 9 is a plan view, a front view, a rear view, both of right- and left-hand side views, and a bottom view of a fusion tray 130.

FIG. 9 depicts a plan view, front view, rear view, right-hand and left-hand side views, and bottom face view of the fusion tray 130. The xyz rectangular coordinates in FIG. 9 relates a plan view, in the middle of the figure, depicting the bottom face 131. The fusion tray 130 is constituted by the bottom face 131, rear face 132, front face 133, left face 134, right face 135, and top face 136. The hole 131h formed in the bottom face 131 at the lower left is overlaid on the hole 126h formed in the top face 126 of the clamp tray 120 at the lower left, therefore, the fusion tray 130 and the clamp tray 120 can be coupled using a nylatch through these holes. Similarly, the hole 131h formed in the bottom face 131 at the upper right is overlaid on the hole 126h formed in the top face 126 of the clamp tray 120 at the upper right, therefore, the fusion tray 130 and the clamp tray 120 can be coupled using them using a nylatch through these holes. Such overlaying allows the fusion tray 130 to be secured onto the clamp tray 120.

The lid 140 in FIG. 1 is secured by using the hole 136h formed in the top face 136 in FIG. 9 and a nylatch n in the same manner as above.

Holes H4 and H5 formed in the bottom face 131 are designed for introducing an optical fiber therethrough from the clamp tray 120 placed at the lower tier, namely, the first tier. Cord clamps cc3 through cc6 are designed to restrict a routing range of optical fibers introduced through the holes H4 and H5, while a slack of the optical fiber is housed in the fusion tray 130. Namely, the fusion tray 130 doubles as a slack case for housing the slack.

Figure 10:
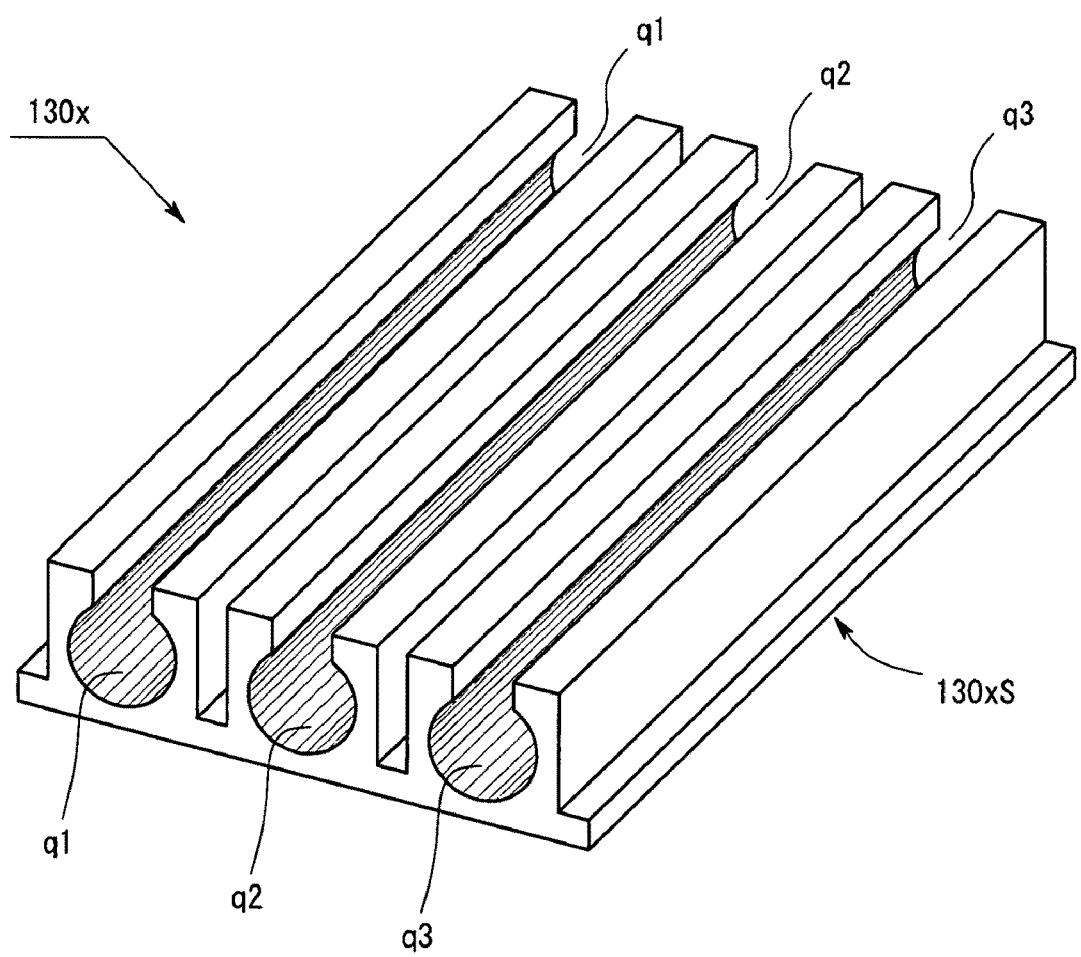
FIG. 10 is a perspective view of a rubber holder holding a fusion reinforcing sleeve.

The fusion connecting portion indicated by X in FIG. 8 is protected by an un-illustrated cylindrical resin-made fusion reinforcement sleeve and held inside the fusion tray 130. FIG. 10 depicts a rubber holder 130x for holding the fusion reinforcement sleeve. This holder 130x has tube-like gripping portions q1, q2, and q3 having the top face thereof opened along its axial direction so that the top face has a long and thin slit. The gripping portions can hold a fusion reinforcement sleeve by mating with each other. Thus, fusion connecting portions indicated by X in FIG. 8 are held in this rubber-made holder 130x.

Holders 130x, totaling two, are secured to the regions β and γ in the bottom face 131 using double-sided adhesive tape in such a manner that the back side 130xS of the holder 130x mates with the bottom face 131. Accordingly, a fusion connecting portion is held inside the fusion tray 130.

With the fusion tray 130 overlaid on the clamp tray 120, the hole H3 formed at the center of the bottom face 131 is designed for allowing checking of the inside of the clamp tray 120, contributing to a reduction in the weight of the fusion tray 130.

The optical cable (single mode fiber) having the connector indicated by the symbol SC in FIG. 8 is drawn out from the lid 140 in FIG. 1 through the outlet 141 or outlet 142, and the SC connector at its end is connected with the double SC adaptor in FIGS. 1 and 4. The double SC adaptor allows SC connectors at the ends of a relay fiber extended from the connector terminal 180 to be connected with the mating side thereof, thereby attaining a proper connection of the optical fiber of the first optical cable with that of the second optical cable CB2 in the double SC adaptor 170. Needless to say, the other end of the relay fiber is disposed at a connecting point in the connector terminal 180.

A wire drawn out from the end of the second optical cable CB2 is taken out through either of the windows w1 through w4 or the inlets J1 and J2, and the nylon connector NC2 (female) at its end is directly coupled with another nylon connector (male) directly provided at the end of a relay wire path extended to the inside of the enclosure 110 from the connector terminal 180.

Figure 11:
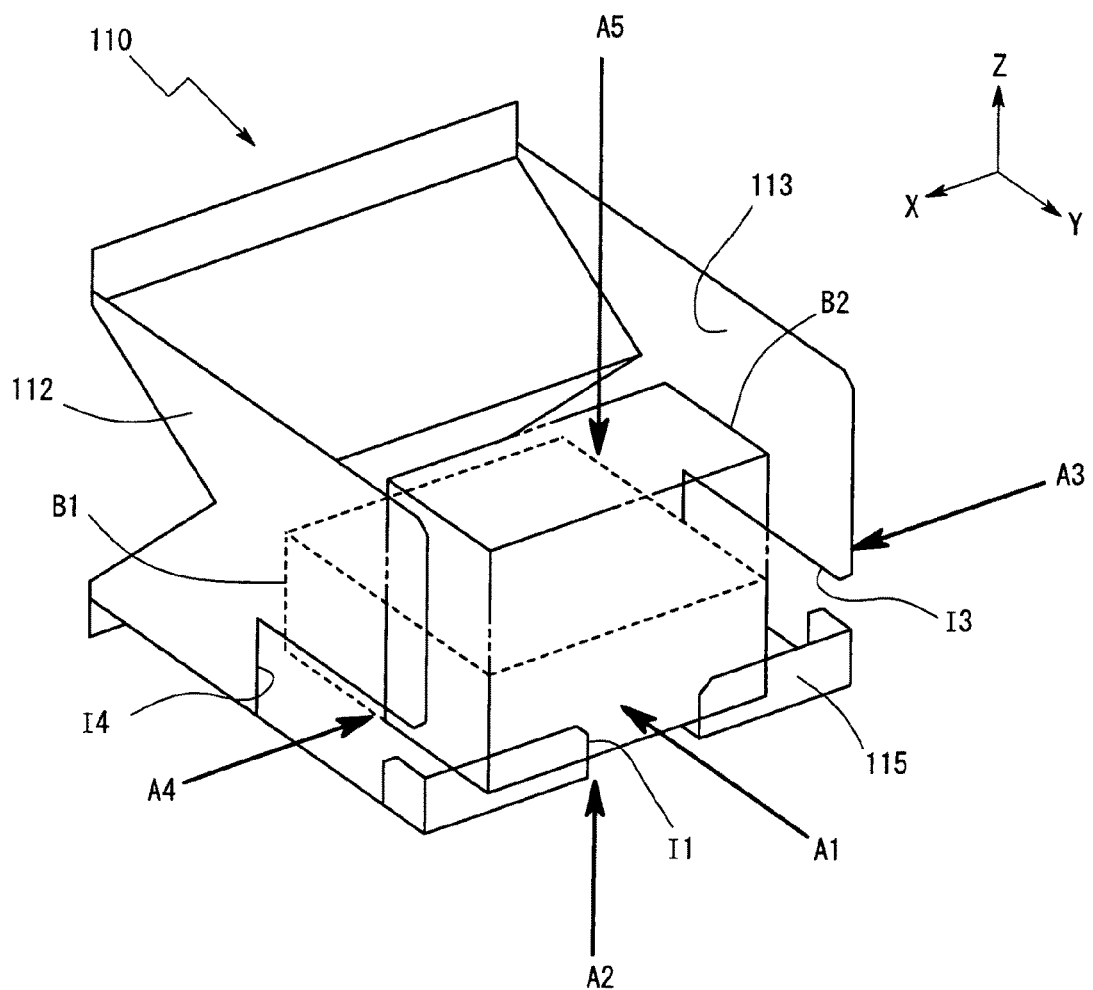
FIG. 11 is a perspective view describing a mounting position (three-dimensional orientation) of an end securing box 150.

The installation position (three dimensional orientation) of the end securing box 150 is described below with reference to FIGS. 2, 5, and 11. The XYZ coordinates in FIG. 11 correspond to those in FIGS. 1 and 2, where the Z-axis lies along the vertical direction. The two-stage multi-tiered end securing box 150 made up of the clamp tray 120, fusion tray 130, and lid 140 is disposed at the spatial region B1 or B2 in FIG. 11. Directions along A2 and A5 are parallel to the Z-axis, directions along A3 and A4 are parallel to the X-axis, and the direction along A1 is parallel to the Y-axis.

The holes h1 through h8 below correspond to the second hole described in claim 7.

(1) The case where the second optical cable CB2 is introduced through the inlet I1.

In this case, the end securing box 150 is disposed (transversely) in the spatial region B1. The end securing box is secured by tying a nylatch n through the hole h1 in the rear face 122 and the hole H1 in the rear face 115 as well as tying a nylatch n through the hole h2 in the rear face 122 and the hole H2 in the rear face 115. This allows the second optical cable CB2 to be horizontally introduced through the inlet I1 along the direction indicated by A1 in FIG. 11.

At this time, the left face 113 of the enclosure 110 is oriented to be parallel to the left face 124 of the clamp tray 120 and the left face 134 of the fusion tray 130, the left face 124 and the left face 134 constituting the left face of the end securing box 150.

(2) The case where the second optical cable CB2 is introduced through the inlet I2.

In this case, the end securing box 150 is disposed (vertically) in the spatial region B2. The end securing box is secured by tying a nylatch n through the hole h7 in the bottom face 121 and the hole H1 in the rear face 115 as well as tying a nylatch n through the hole h8 in the bottom face 121 and the hole H2 in the rear face 115. This allows the second optical cable CB2 to be vertically introduced through the inlet I2 along the direction indicated by A2 in FIG. 11.

At this time, the left face 113 of the enclosure 110 is oriented to be parallel to the right face 125 of the clamp tray 120 and the right face 135 of the fusion tray 130, the right face 125 and the right face 135 constituting the right face of the end securing box 150.

(3) The case where the second optical cable CB2 is introduced through the inlet I3.

In this case, the end securing box 150 is disposed (transversely) in the spatial region B1. The end securing box is secured by tying a nylatch n through the hole h3 in the front face 123 and the hole H1 in the rear face 115 as well as tying a nylatch n through the hole h4 in the front face 123 and the hole H2 in the rear face 115. This allows the second optical cable CB2 to be horizontally introduced through the inlet I3 along the direction indicated by A3 in FIG. 11.

At this time, the left face 113 of the enclosure 110 is oriented to be parallel to the right face 125 of the clamp tray 120 and the right face 135 of the fusion tray 130, the right face 125 and the right face 135 constituting the right face of the end securing box 150.

However, if the second optical cable CB2 is introduced along the X-axis direction in relation to the enclosure, the second optical cable CB2 is secured in the X-axis direction in FIG. 6 using the inlet J2, the lip L2, and the holes hc and hd in FIG. 6.

(4) The case where the second optical cable CB2 is introduced through the inlet I4.

In this case, the end securing box 150 is disposed (transversely) in the spatial region B1. The end securing box is secured by tying a nylatch n through the hole h1 in the rear face 122 and the hole H1 in the rear face 115 as well as tying a nylatch n through the hole h2 in the rear face 122 and the hole H2 in the rear face 115. This allows the second optical cable CB2 to be horizontally introduced through the inlet I1 along the direction indicated by A4 in FIG. 11.

At this time, the left face 113 of the enclosure 110 is oriented to be parallel to the left face 124 of the clamp tray 120 and the left face 134 of the fusion tray 130, the left face 124 and the left face 134 constituting a left face of the end securing box 150.

(5) The case where the second optical cable CB2 is introduced through the inlet I5.

In this case, the end securing box 150 is disposed (transversely) in the spatial region B1. The end securing box is secured by tying a nylatch n through the hole h5 in the bottom face 121 and the hole H1 in the rear face 115 as well as tying a nylatch n through the hole h6 in the bottom face 121 and the hole H2 in the rear face 115. This allows the second optical cable CB2 to be vertically introduced through the inlet I5 along the direction indicated by A5 in FIG. 11.

At this time, the left face 113 of the enclosure 110 is oriented to be parallel to the left face 124 of the clamp tray 120 and the left face 134 of the fusion tray 130, the left face 124 and the left face 134 constituting the left face of the end securing box 150.

The use of the arbitrary disposition approach as mentioned above allows the end securing box 150 to be oriented toward any direction so that either of the left or right face of the end securing box 150 is parallel to the left face of the enclosure 110, namely, allows the end securing box 150 to be disposed in the enclosure so that it is oriented toward any direction on a right-angle basis. Accordingly, the end securing box can be disposed in the enclosure so that the second optical cable CB2 is introduced along any of the directions indicated by A1 through A5.

Figure 12:
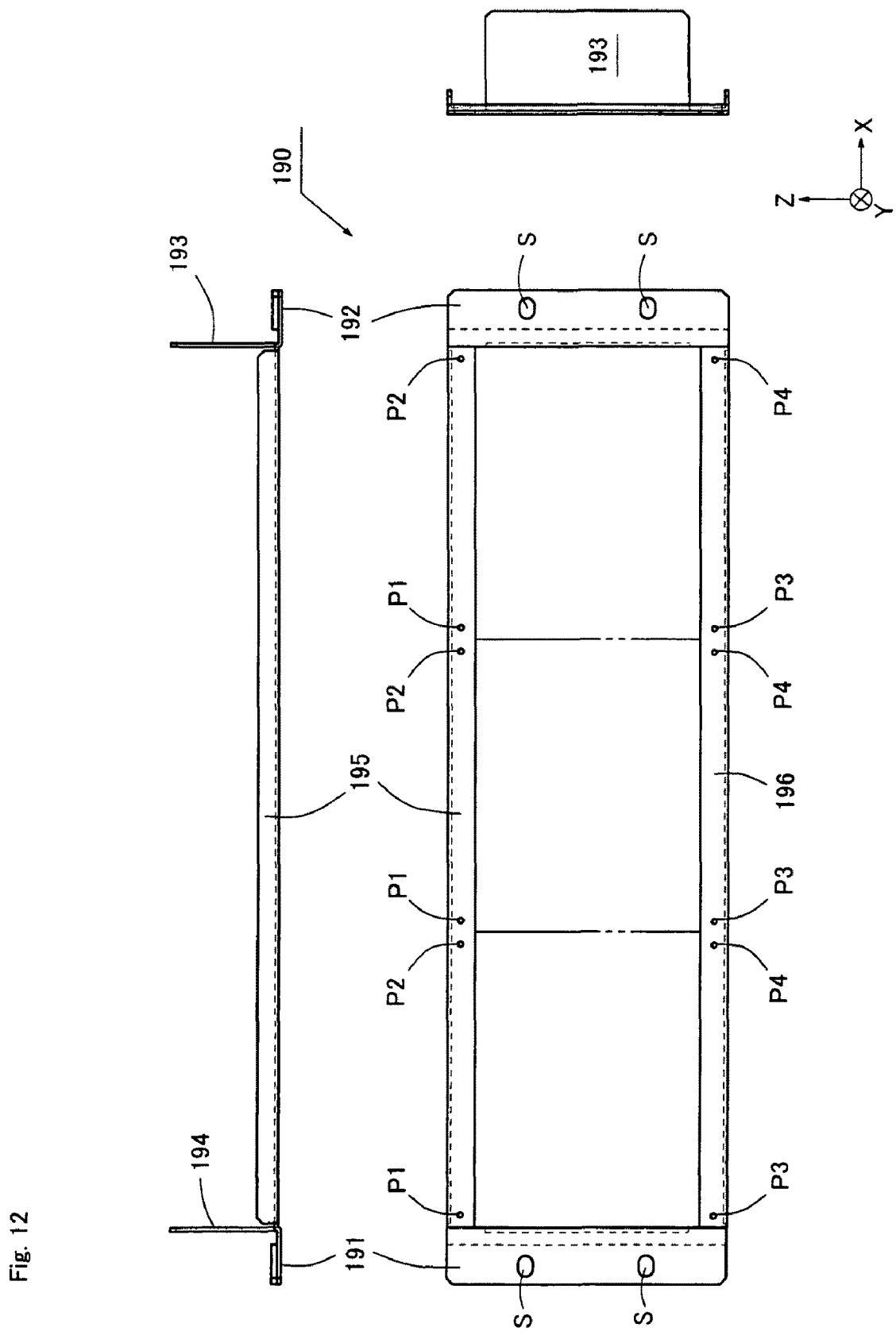
FIG. 12 is a front view, a plan view, and a side view of an outer frame panel 190.

FIG. 12 shows a front view, a plan view, and a side view of the outer frame panel 190 to be installed on the wall in which the optical termination unit 100 is housed. In a wall in which the optical termination unit 100 is to be installed, a recessed space for housing the optical termination unit 100 is created, while the outer frame panel, for example, is installed on the outer surface of the wall. The outer frame panel 190 is designed so as to have three optical termination units 100 disposed side by side therein along the X-axis direction. Its side plate 193, parallel to the ZX surface, is slid in the recessed space along the side surface of the wall so that it is placed into the recess (recessed space). The outer frame panel 190 has the left end frame 191 and the right end frame 192 projecting at the left and right ends thereof, respectively, and formed so as to be parallel to the wall surface. It is secured to the wall surface using four holes provided in the left end frame 191 and the right end frame 192.

The enclosure 110 is secured to the outer frame panel 190 using screws in such a manner that holes p1 and p2 formed in the upper end face 111u of the enclosure 110 are aligned with the holes P1 and P2 formed in the upper end frame 195 of the outer frame panel 190, respectively, and the holes p3 and p4 formed in the lower end face 111d of the enclosure 110 are aligned with the holes P3 and P4 formed in the lower end frame 196 of the outer frame panel 190. This allows three optical termination units 100 to be disposed side by side along the X-axis direction.

As described above, any number of optical termination units 100 can be disposed in a group.

As described above, the use of the optical termination unit 100 according to Example 1 allows an optical cable to be easily projected straight vertically or horizontally, namely, in any of the upward, downward, rightward, leftward, and rearward directions. Besides, the need for bending the second optical cable CB2 inside the enclosure 110 is completely eliminated, thereby enhancing the efficiency of cable laying or servicing operations. As mentioned above, since the optical termination unit 100 integrated with the connection panel according to Example 1 contributes to a reduction in size of the whole system, it is effective in the implementation of a smaller-sized television relaying optical system as well as a smaller-sized TV camera optical system for broadcasting studios. In particular, it is highly useful for use in a stadium, seats in a theater, and a small studio for which the use of a connector board with smaller occupied areas is preferable.

Needless to say, the optical termination unit 100 according to Example 1 can be mounted to a rack or the like.

Example 2

Figure 13:
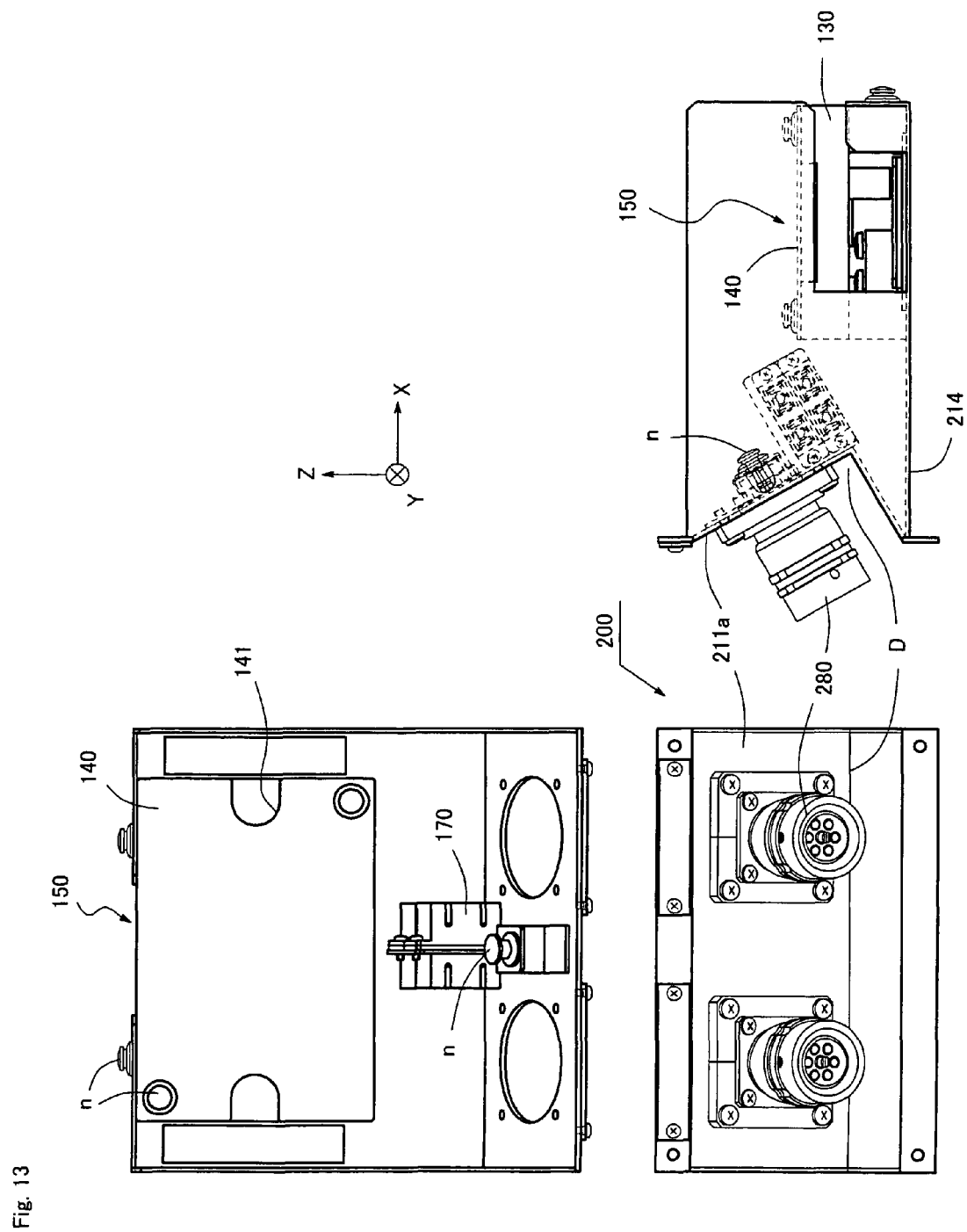
FIG. 13 is a front view, a plan view, and a side view of an optical termination unit 200 according to Example 2.

FIG. 13 shows a front view, a plan view, and a side view of the optical termination unit 200 according to Example 2. The XYZ coordinates in the figure relates to the optical termination unit 200 in a front view at the lower left where the Z-axis is taken along the vertical direction. The optical termination unit 200 has a height, namely, the length along the Z-axis, approximately two-thirds that of the optical termination unit 100 according to Example 1. To compensate for this, it has a somewhat longer depth along the Y-axis direction. A slight shift of the end securing box 150 to the rear can effectively reduce the height. The front upper part 211a having a connector terminal 280 is inclined at 60 degrees.

In other words, the enclosure of the optical termination unit 200 is provided at the front face thereof with a recess D recessing inwardly. The recess is provided with a slant surface (namely the front upper part 211a above) facing downward and inclined at 60 degrees, on which the connector terminal 280 is provided to allow connection with the first optical cable extending from a TV camera.

With this arrangement, even if significant limitations are placed on the height of the enclosure, namely, on the length along the vertical direction of the optical termination unit 200, the first optical cable can be extended obliquely downward through the connection panel at the front face, thereby making the enclosure of the optical termination unit 200 very small.

Example of Other Modification

The embodiment according to the present invention is not limited to the embodiments described above. The following modifications may be made to the embodiments. These modifications also provide the effect according to the present invention.

Modification Example 1

For example, the clamp tray 120 (FIG. 5) in Example 1 has a rectangular shape in plan view with a longer X-axis length and a shorter Y-axis length, but it may have a square shape in plan view. In this case, only one inlet (J1 or J2) suffices for introducing a second optical cable into the clamp tray 120 due to equal vertical and horizontal sizes. In this case, the clamp tray 120 has a short X-axis length equal to the Y-axis length in FIG. 5. Besides, the number of holes (ha, hb, hc, and hd) to be formed for securing the TM clamp 160 decreases by half, which is advantageous to a reduction in size of the end securing box 150 as well as an improvement in the manufacturing efficiency.

Furthermore, the clamp tray 120 may have three or more inlets (J1 or J2) formed to allow introduction of a second optical cable. This modification also provides the same effect as the examples above according to the present invention.

Modification Example 2

Examples of modifications to the optical termination unit 100 and the optical modification unit 200 are depicted in FIGS. 14A through 14C. Although the optical termination unit 100 has the front connection panel of the enclosure 110 structured to include the front upper part 111a and the front lower part 111b, these slanted front upper parts are not necessarily perpendicular to each other.

For example, as exemplified in FIGS. 14A and 14B, part of the front panel of the enclosure may be structured to have the front lower part 111b' perpendicular to the vertical bottom face of the enclosure, or the front lower part 111b' perpendicular to the bottom face of the enclosure. Besides, as exemplified in FIG. 14-B, part of the front panel of the enclosure may be structured to have the slanted surface 111c' inclined at about 30 degrees and extending obliquely upward toward the rear of the front recess.

Furthermore, as exemplified in FIG. 14-C, part of the front panel of the enclosure may be structured to have only front upper part 211a' by extending the front upper part 211a in FIG. 13 to the bottom face 214.

Modification Example 3

The front panel of the enclosure may have a curved-surface shape. In the existing apparatus in FIG. 15, the second surface 3b must be provided to install the connection unit 4 thereon. However, since the optical termination unit of the present invention needs not have the slanted surface 3b extending upward toward the rear of the front recess, as shown above, it allows greater flexibility in designing the shape of the enclosure front panel on which the connection panel is disposed. For this reason, the optical termination unit of the present invention can meet users' requirements in designing at least the front shape of the enclosure.

Modification Example 4

In Example 1 above, the second optical cable CB2 includes two optical fibers therethrough. Needless to say, these optical fibers may include multimode fibers.

Besides, in Example 1 above, the second optical cable CB2 includes two optical fibers therethrough, while one second optical cable may include any number of optical fibers. Needless to say, this is the case with the first optical cable.

Furthermore, in Example 1, two second optical cables CB2 are introduced into one end securing box 150. However, any number of second optical cables can be introduced into the end securing box of the present invention. Needless to say, this is the case with the number of connector terminals (180, 280) installed.

The present invention is useful to, for example, a TV relaying optical system for use in athletics stadiums or outdoor stadiums and a TV camera optical system for use in broadcasting studios. In addition to it, it can be generally applied to buildings in a field site where video shooting associated with TV relaying or the like is expected to take place.

The second optical cable CB2 in Example 1 above is provided with wires and shields mm as depicted in FIG. 8. Needless to say, the optical termination unit of the present invention is also useful to a cable (first or second optical cable) of only optical fibers provided with no wires or shields.

What is claimed is:

1. An optical termination unit integrally constructed with a connection panel to be secured to a building for allowing connection with a terminal of a first optical cable to be connected with filming equipment, the unit comprising:
   an enclosure having an inlet for a second optical cable secured to a building provided at a rear face, top face, bottom face, left side, and right side thereof, five surfaces in total, and having a front panel constructed with the connection panel; and
   a rectangular solid shaped end securing box for securing a tension member end exposed from the second optical fiber therein,
   wherein the direction in which the exposed portion of the tension member is secured inside the end securing box is along a line normal to any one of other four adjacent surfaces of the end securing box perpendicular to a securing surface for securing the end; and
   wherein the end securing box is disposed inside the enclosure so that each line normal to the securing surface and the four adjacent surfaces is oriented toward the vertical or horizontal direction and any one surface of the end securing box is arbitrarily oriented so as to be parallel to the left side.

2. The optical termination unit according to claim 1, wherein the end securing box is secured to the bottom face of the enclosure while being in contact with the rear face and bottom face.

3. The optical termination unit according to claim 1, wherein the end securing box has only one surface for becoming the securing surface;

wherein a surface for introducing the second optical cable into the end securing box is selected from only two surfaces, perpendicular to each other, of the four adjacent surfaces according to any one of the five surfaces on which the inlet is provided; and wherein each of the two surfaces is provided with an inlet for introducing the second optical cable.

4. The optical termination unit according to claim 2, wherein the end securing box has only one surface for becoming the securing surface;

wherein a surface for introducing the second optical cable into the end securing box is selected from only two surfaces, perpendicular to each other, of the four adjacent surfaces according to any one of the five surfaces on which the inlet is provided; and wherein each of the two surfaces is provided with an inlet for introducing the second optical cable.

5. The optical termination unit according to claim 1, wherein the end securing box is provided with a fusion tray, doubling as a case for taking up slack, for housing a fused portion where different optical cables are connected at each one end thereof by means of fusion and slack of the fused optical cable.

6. The optical termination unit according to claim 5, wherein the end securing box has a two-stage multi-tiered box structure that can be separated into two bodies; and wherein the fusion tray is constructed with one body of the two bodies which does not have the securing surface.

7. The optical termination unit according to claim 1, wherein the front face of the enclosure includes a recess recessing inward;

wherein the recess is provided with a slant surface facing downward and inclined at more than 45 degrees and less than 90 degrees; and wherein the slant surface is provided with a connector terminal to be connected with the first optical cable.

8. The optical termination unit according to claim 2, wherein the front face of the enclosure includes a recess recessing inward;

wherein the recess is provided with a slant surface facing downward and inclined at more than 45 degrees and less than 90 degrees; and wherein the slant surface is provided with a connector terminal to be connected with the first optical cable.

9. The optical termination unit according to claim 3, wherein the front face of the enclosure includes a recess recessing inward;

wherein the recess is provided with a slant surface facing downward and inclined at more than 45 degrees and less than 90 degrees; and wherein the slant surface is provided with a connector terminal to be connected with the first optical cable.

10. The optical termination unit according to claim 4, wherein the front face of the enclosure includes a recess recessing inward;

wherein the recess is provided with a slant surface facing downward and inclined at more than 45 degrees and less than 90 degrees; and wherein the slant surface is provided with a connector terminal to be connected with the first optical cable.

11. The optical termination unit according to claim 5, wherein the front face of the enclosure includes a recess recessing inward;

wherein the recess is provided with a slant surface facing downward and inclined at more than 45 degrees and less than 90 degrees; and wherein the slant surface is provided with a connector terminal to be connected with the first optical cable.

12. The optical termination unit according to claim 6, wherein the front face of the enclosure includes a recess recessing inward;

wherein the recess is provided with a slant surface facing downward and inclined at more than 45 degrees and less than 90 degrees; and wherein the slant surface is provided with a connector terminal to be connected with the first optical cable.

13. The optical termination unit according to claim 1, wherein the enclosure has a first hole formed at the surface of contact with the end securing box;

wherein the end securing box has a second hole formed at the position contacting with the enclosure and corresponding to the first hole; and whereby a fastener running through the first and second holes is used to secure the end securing box to the inside of the enclosure, the first and second holes overlapping with each other.

14. The optical termination unit according to claim 2, wherein the enclosure has a first hole formed at the surface of contact with the end securing box;

wherein the end securing box has a second hole formed at the position contacting with the enclosure and corresponding to the first hole; and whereby a fastener running through the first and second holes is used to secure the end securing box to the inside of the enclosure, the first and second holes overlapping with each other.

15. The optical termination unit according to claim 4, wherein the enclosure has a first hole formed at the surface of contact with the end securing box;

wherein the end securing box has a second hole formed at the position contacting with the enclosure and corresponding to the first hole; and whereby a fastener running through the first and second holes is used to secure the end securing box to the inside of the enclosure, the first and second holes overlapping with each other.

16. The optical termination unit according to claim 7, wherein the enclosure has a first hole formed at the surface of contact with the end securing box;

wherein the end securing box has a second hole formed at the position contacting with the enclosure and corresponding to the first hole; and whereby a fastener running through the first and second holes is used to secure the end securing box to the inside of the enclosure, the first and second holes overlapping with each other.

17. The optical termination unit according to claim 11, wherein the enclosure has a first hole formed at the surface of contact with the end securing box;

wherein the end securing box has a second hole formed at the position contacting with the enclosure and corresponding to the first hole; and whereby a fastener running through the first and second holes is used to secure the end securing box to the inside of the enclosure, the first and second holes overlapping with each other.

18. The optical termination unit according to claim 13, wherein the enclosure has the first hole on any one of the rear face, top face, bottom face, left side, and right side thereof; and wherein the end securing box has the second hole provided in a plurality on all surfaces contacting with a surface containing the first hole of the enclosure.

\* \* \* \* \*